Patented July 13, 1937

2,086,880

UNITED STATES PATENT OFFICE 2,086,880

POLYAZODYESTUFFS

Hans Schindhelm and Carltheo Schultis, Frankfort-on-the-Main-Fechenheim, Germany, assignors to General Aniline Works, Inc., New York, N. Y., a corporation of Delaware No Drawing. Application June 14, 1935, Serial No. 26,703. In Germany June 27, 1934

4 Claims. (Cl. 260—38.5)

Our present invention relates to polyazodyestuffs more particularly to those of the general formula:

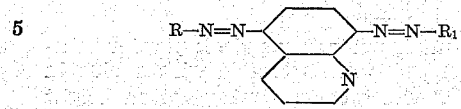

wherein R means the radicle of a diazotizable aromatic amine which may contain the radicle of a further azocompound of the benzene or naphthalene series and $R_1$ the radicle of an aminohydroxy-naphthalene sulfonic acid, which may be substituted at the nitrogen atom which dyestuffs are capable of forming copper complex compounds and dye cotton bluish to violet to grayish shades of a good fastness to light, particularly in the form of the copper complex compounds.

The new dyestuffs are obtained by combining a diazocompound or a diazotized aminoazocompound with 8-aminoquinoline, diazotizing the aminoazodyestuff thus formed and combining with a suitable combining component.

In order to further illustrate our invention the following examples are given; but we wish it, however, to be understood that our invention is not limited to the particular products or reaction conditions stated therein.

Example 1

5-(4'-sulfophenyl-azo-)-8-aminoquinoline prepared by diazotizing 17,3 parts of sulfanilic acid and combining with a hydrochloric acid solution of 14.4 parts of 8-aminoquinoline with the addition of sodium acetate is dissolved in a sufficient amount of dilute caustic soda solution and diazotized with ice-cool hydrochloric acid and 6.9 parts of sodium nitrite. Then the formed diazocompound is combined with 36 parts of 2-(3'-carboxyphenylamino)-5-naphthol-7-sulfonic acid in the presence of pyridine and sodium carbonate.

The dyestuff is when dry a dark powder soluble in concentrated sulfuric acid with a blue and in water with a reddish violet color. It dyes cotton strong reddish violet shades, which turn to blue when converting the dyestuff into the copper complex compound, while preserving the good affinity and substantially increasing the fastness to light. The dyestuff corresponds to the formula:

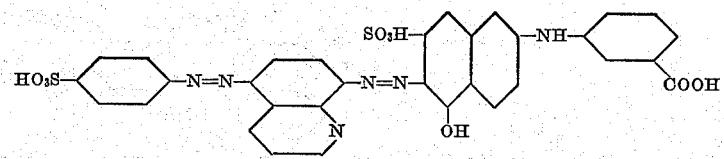

When starting from 2-naphthylamine-4,8-disulphonic acid and carrying out the other steps of the reaction as described above the formed disazodyestuff dyes cotton very bright blue shades of a good fastness.

Example 2

35.9 parts of the aminoazodyestuff, obtained by combining diazotized aniline-2,5-disulfonic acid with α-naphthylamine in the presence of hydrochloric acid, are diazotized and combined with 14.4 parts of 8-amino-quinoline in the presence of hydrochloric acid and sodium acetate. The formed amino-disazodyestuff is diazotized again and combined with 31.5 parts of 2-phenylamino-5-naphthol-7-sulfonic acid in the presence of sodium carbonate and pyridine. The dyestuff of the formula:

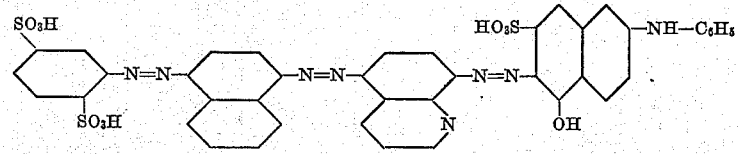

is when dry a dark powder soluble in concentrated sulfuric acid with a blue in water with a violet color. It dyes cotton bright blue shades turning to greenish blue of a very good affinity and fastness to light when converting the dyestuff into its copper complex compound.

When using for the formation of the trisazodyestuff as first component the 2-naphthylamine-4,8-disulfonic acid the formed dyestuff of the formula

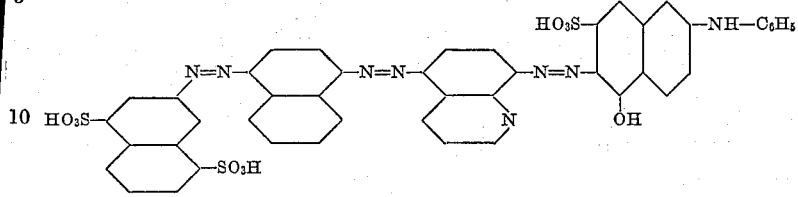

dissolves in water with a reddish blue and in concentrated sulfuric acid with a blue color. It dyes cotton blue shades which turn to gray of a very good fastness to light when converting the dyestuff into its copper complex compound.

We claim:—

1. Polyazodyestuffs of the general formula

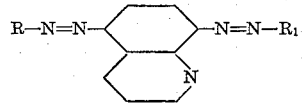

wherein R stands for a radicle selected from the group consisting of diazotizable aromatic amines and diazotizable aromatic amines containing a further azo compound of the benzene or naphthalene series, and $R_1$ stands for a radicle selected from the group consisting of aminohydroxynaphthalene sulfonic acid and aminohydroxynaphthalene sulfonic acids substituted at the nitrogen atom, which dyestuffs are capable of forming copper complex compounds and dye cotton bluish to violet to grayish shades of a good fastness to light, particularly in the form of the copper complex compounds.

2. The disazodyestuff of the formula

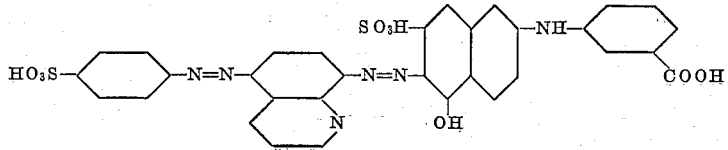

which dyestuff is when dry a dark powder soluble in concentrated sulfuric acid with a blue and in water with a reddish violet color, dyeing cotton strong reddish violet shades which turn to blue when converting the dyestuff into the copper complex compound while preserving the good affinity and substantially increasing the fastness to light.

3. The trisazodyestuff of the formula

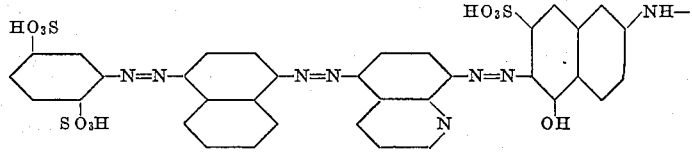

which dyestuff is when dry a dark powder soluble in concentrated sulfuric acid with a blue in water with a violet color, dyeing cotton bright blue shades turning to greenish blue of a very good affinity and fastness to light when converting the dyestuff into its copper complex compound.

4. The trisazodyestuff of the formula

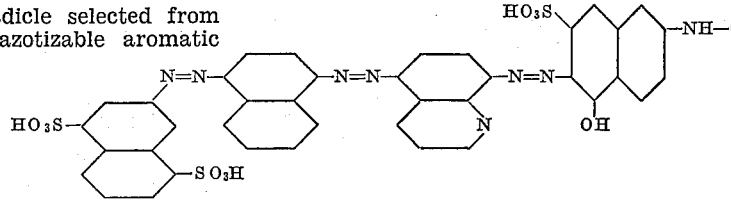

which dyestuff dissolves in water with a reddish blue and in concentrated sulfuric acid with a blue color, dyeing cotton blue shades which turn to gray of a very good fastness to light when converting the dyestuff into its copper complex compound.

HANS SCHINDHELM.
CARLTHEO SCHULTIS.